United States Patent

[11] 3,628,621

[72] Inventor William H. Lee
 505 North Lake Shore Drive 01306,
 Chicago, Ill. 60611
[21] Appl. No. 2,124
[22] Filed Jan. 12, 1970
[45] Patented Dec. 21, 1971

[54] DRIVE AND CONTROL SYSTEM FOR ELECTRIC AUTOMOBILES
 9 Claims, 6 Drawing Figs.
[52] U.S. Cl. .................................................. 180/65 R, 318/139
[51] Int. Cl. .................................................. B60l 11/18, B60l 15/12
[50] Field of Search ........................................... 180/65; 318/139; 105/50

[56] References Cited
 UNITED STATES PATENTS

| | | | |
|---|---|---|---|
| 3,114,871 | 12/1963 | Schenkelberger | 180/65 X |
| 3,182,742 | 5/1965 | Dow | 180/65 X |
| 3,190,387 | 6/1965 | Dow | 180/65 |
| 3,349,309 | 10/1967 | Dannettell | 318/139 X |
| 3,454,122 | 7/1969 | Grady, Jr. | 180/65 |

FOREIGN PATENTS

| | | | |
|---|---|---|---|
| 1,074,443 | 7/1967 | Great Britain | 180/65 |

*Primary Examiner*—Benjamin Hersh
*Assistant Examiner*—Milton L. Smith
*Attorney*—Bosworth, Sessions, Herrstrom & Cain ABSTRACT: A drive and control system for electrically powered automobiles. Controlled rectifiers are connected between a battery and the armature circuit of a compound motor to supply increasing amounts of current to the armature for acceleration. Transistors are connected between battery and shunt field to control current thereto. An accelerator pedal connected to a carbon pile resistor controls the conduction of the transistors. Relays connect the battery directly to the shunt field for starting, and control the sequence in which increasing amounts of current are supplied to the armature. A charging circuit permits charging of the main battery from a conventional AC source. A switch is provided to allow connection of the motor as a generator for charging the battery when the vehicle is towed or pushed. Motors and associated switches and relays may be provided to control and operate an automatic clutch in conjunction with the drive and control system.

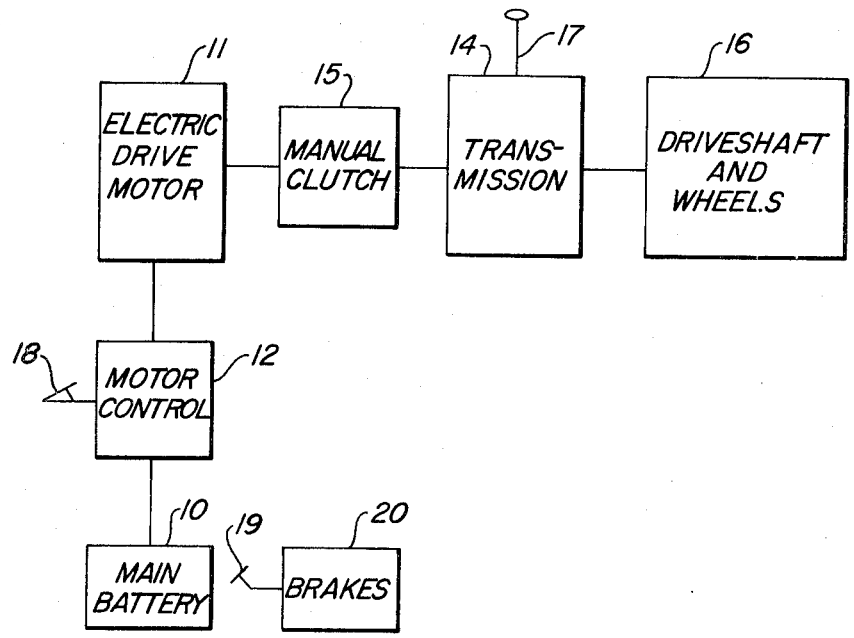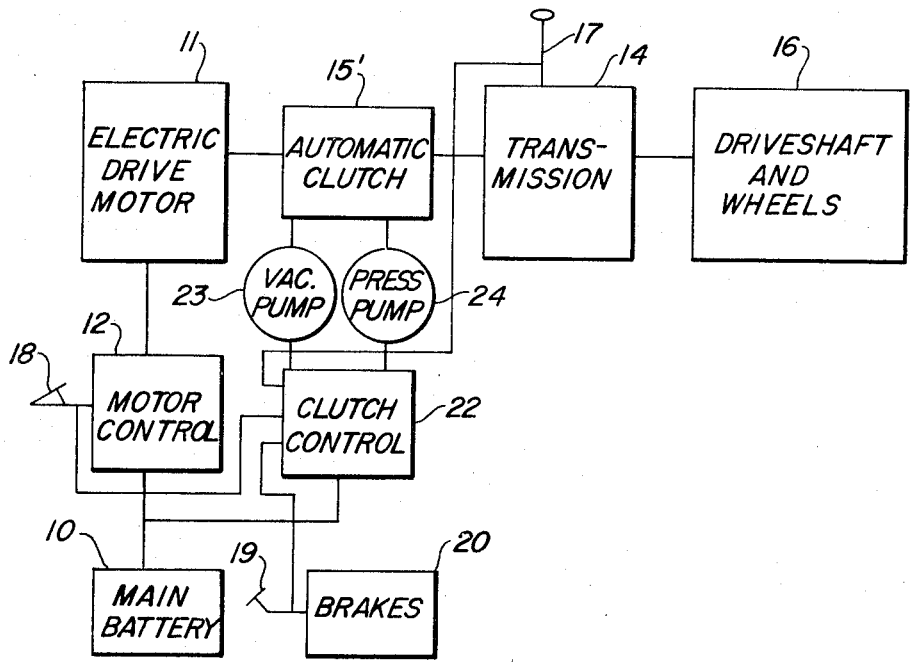

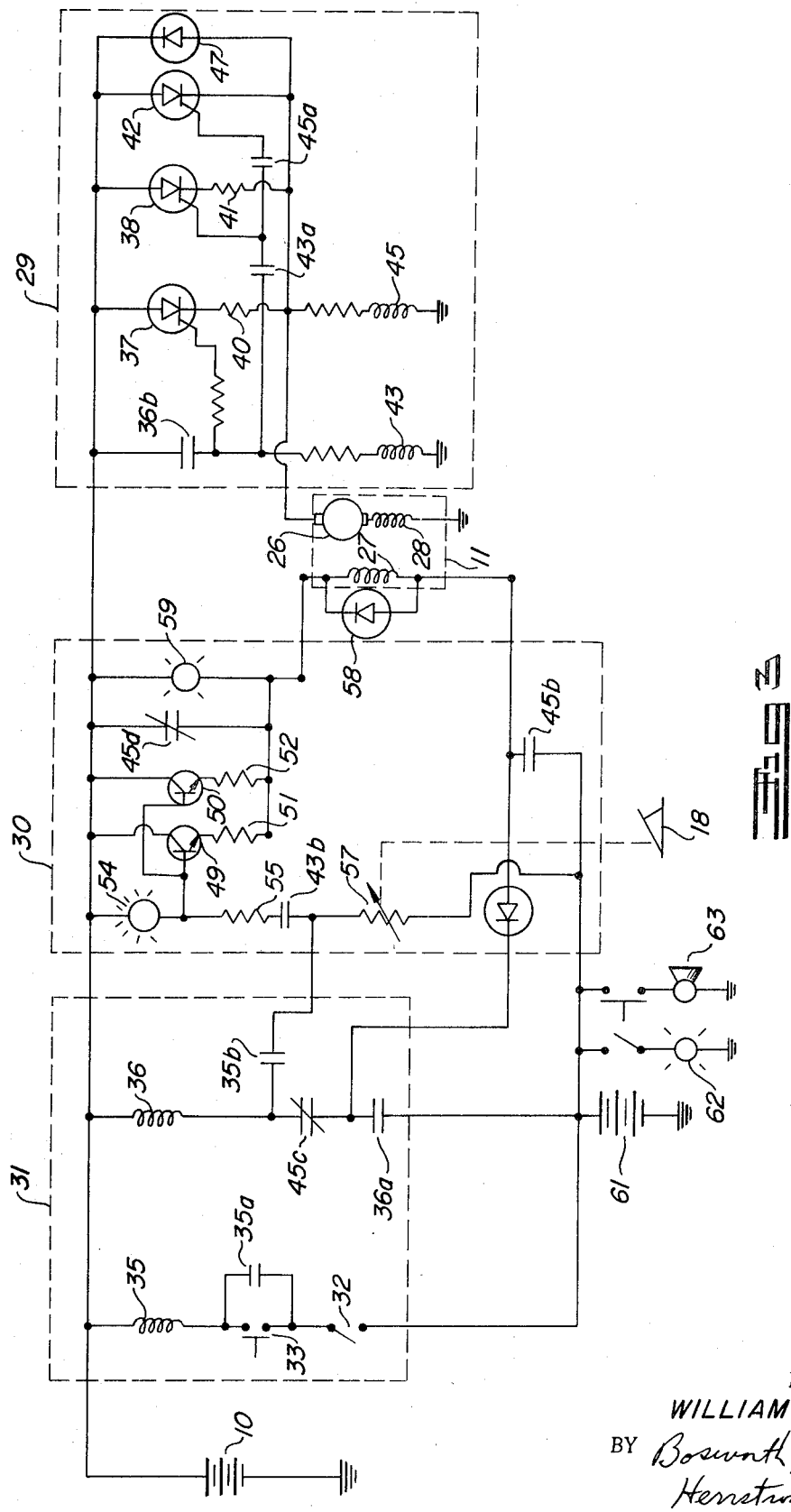

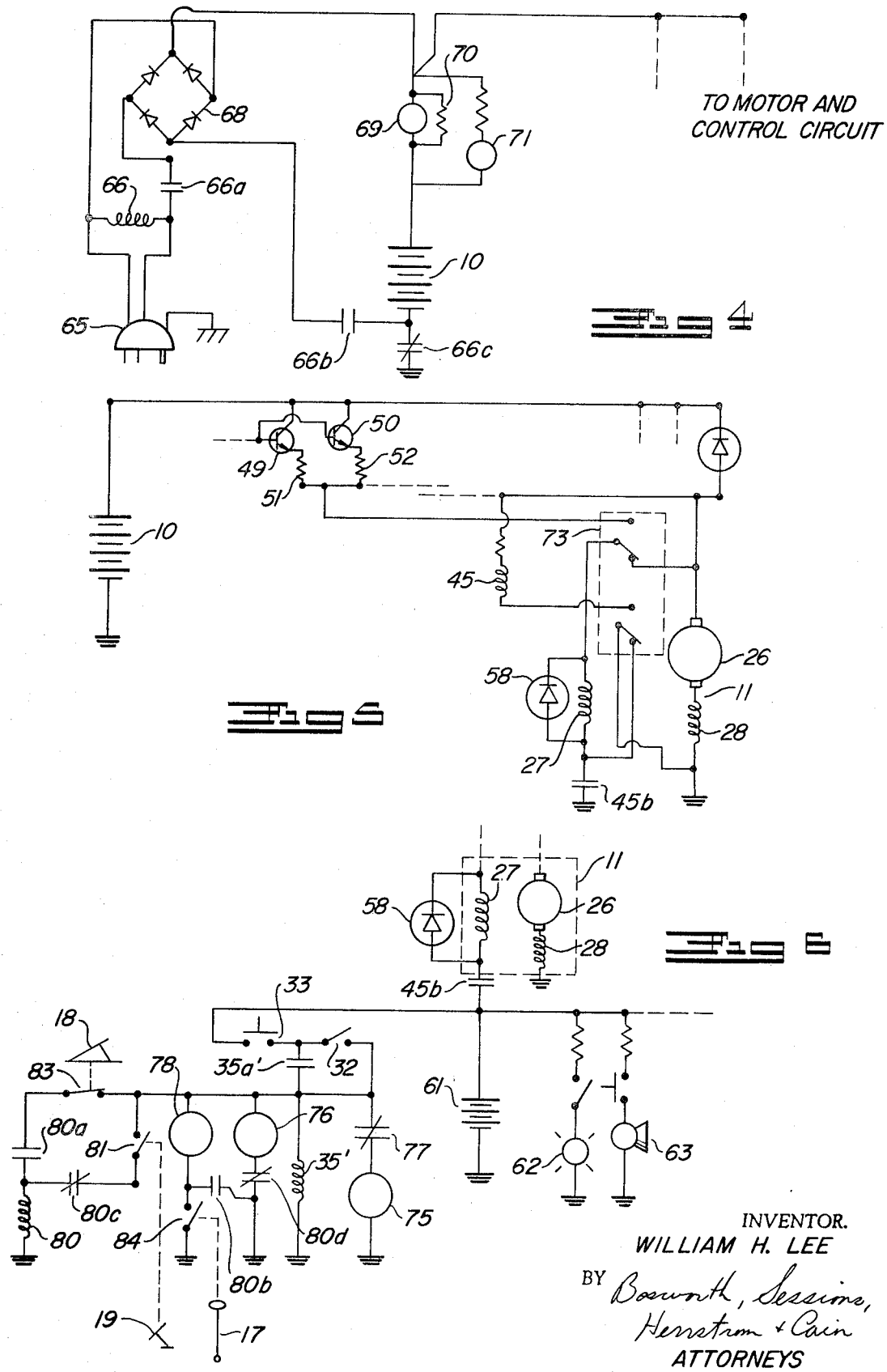

DRIVE AND CONTROL SYSTEM FOR ELECTRIC AUTOMOBILES

BACKGROUND OF THE INVENTION

This invention relates to controls for electric motors and more particularly to a drive and control system for an electrically powered automobile.

Electrically powered automobiles have recently acquired increased significance because of the advantage they offer of not contributing to the existing levels of air pollution. The problems associated with their use have not heretofore been overcome to an extent sufficient to allow them to achieve significant public acceptance. The chief reason for their general lack of acceptance is their reduced level of performance compared to conventional automobiles.

The lower level of performance occurs specifically in reduced driving range and relatively poor, unsmooth acceleration. Prior control systems have contributed to both of these problems, to the first because the systems themselves consumed a significant amount of battery power, and to the second as a consequence of the designs.

SUMMARY OF THE INVENTION

A general object of this invention is the provision of a drive and control system for electrically powered automobiles that overcomes the problems noted above encountered with prior control systems. More particular objects are the provision of an electrical drive and control system that provides smooth operation and acceleration and that may be employed on automobiles having a manually operated clutch and conventional transmission or on automobiles having an automatic clutch and conventional transmission.

Another object of this invention is the provision of a control system that consumes very little power.

Still another object is the provision of a drive and control system that employs the energy developed in regenerative braking to charge the main battery.

Other objects are the provision of a drive and control system that includes means for charging the main battery easily and conveniently at every opportunity and that includes means for allowing the electric drive motor to be operated as a generator when the automobile is towed or pushed thereby to charge the main battery.

Yet another object is the provision of an electrical circuit for controlling and operating an automatic hydraulic clutch in an electrically powered automobile.

A preferred embodiment of this invention comprises a battery, a motor having an armature and a shunt field, and electronic switching means for conducting varying amounts of current to the armature. First control means is provided for causing the switching means to conduct limited amounts of current to the armature. Second control means is provided having a first state operative to connect the battery directly to the field, and a second state determined by the armature voltage of the motor operative to initiate full conduction by the switching means. Transistor means is provided to control current to the field during the second state of the second control means. A variable resistor operated as an accelerator controls the conduction of the transistor means.

BRIEF DESCRIPTION OF THE DRAWINGS

FIG. 1 is a block diagram of the basic portions of an electrically powered automobile having a conventional transmission and manual clutch.

FIG. 2 is a block diagram similar to FIG. 1 in which the electrically powered automobile has an automatic hydraulic clutch operated by an electrical clutch control circuit according to this invention FIG. 3 is a schematic diagram of a preferred embodiment of the basic drive and control system according to this invention.

FIG. 4 is a schematic diagram of a preferred embodiment of battery charging circuit for use in conjunction with the basic drive and control system of FIG. 3.

FIG. 5 is a schematic diagram illustrating a preferred circuit for a "low" mode in which the motor is operated as a generator to charge the main battery when the automobile is being towed or pushed.

FIG. 6 is a schematic diagram of a preferred clutch control circuit employed with the basic drive and control system on an automobile having an automatic hydraulic clutch.

DESCRIPTION OF THE PREFERRED EMBODIMENTS

As shown in FIG. 1, the basic components of an electrically powered automobile employing this invention include a main battery 10 which supplies power to a drive motor 11 through a motor control circuit 12. Motor 11 is connected to a conventional manual transmission 14 through a manual clutch 15. Transmission 14 transmits power to the drive shaft and wheels as indicated at 16 and is controlled by manual gearshift level 17. An accelerator pedal 18 connected to the motor control circuit allows the operator to vary the speed of the automobile as will be explained more fully hereinafter. A conventional brake pedal 19 is provided to operate conventional brakes 20.

In FIG. 2 the electrically powered automobile has an automatic hydraulic clutch 15' that connects motor 11 to conventional manual transmission 14. In the electrically powered automobile the conventional mechanical means driven by the internal combustion engine for operating the automatic clutch is not present, but instead an electrical clutch control circuit 22 is provided for controlling and operating the automatic clutch. The clutch control circuit 22 is operated through the gearshift level 17, the accelerator pedal 18 and the brake pedal 19 and controls a vacuum pump 23 and a hydraulic pressure pump 24 which operate the automatic clutch, all of which will be explained more fully hereinafter.

Referring now to FIG. 3, the drive portion of the drive and control system of this invention comprises battery 10 and motor 11 which has an armature 26 and a shunt field 27. Motor 11 is preferably of the compound type having a series field 28 in addition to shunt field 27. The terminal voltage of battery 10 is preferably on the order of 120 volts. Battery 10 may comprise several batteries in series and should have a high-ampere-hour capacity and be suitable for repeated recharging.

The remainder of the circuit in FIG. 3 controls the transfer of power from battery 10 to motor 11 to provide smooth and trouble-free operation for both city and highway driving. The circuit of FIG. 3 may be used in an electrically powered automobile having either a manual clutch or an automatic hydraulic clutch as shown in FIGS. 1 and 2 respectively.

The control system of FIG. 3 may be regarded as having three principle circuits shown bounded by dashed lines. These circuits are an armature current control circuit 29, a field current control circuit 30 and an enabling and starting circuit 31. It will be appreciated, however, that the different circuits cooperate and interact so that no hard and fast division of circuits is possible. In general, the armature current control circuit 29 functions to control the amount of current supplied to the armature 26 of motor 11 in steps until full conduction is reached. The field current control circuit 30 is operative to control the amount of current supplied to the shunt field winding 27 during higher speed operation but connects the battery 10 directly to the shunt field winding 27 for starting.

The enabling and starting circuit 31 comprises an enabling switch 32 which is analogous to the ignition switch in a conventional automobile, a starting switch 33 and relays 35 and 36. Actuating starting switch 33 does not, in itself, start motor 11 but initiates a sequence of events which results in starting as will be explained below. Relay 35 is provided with normally open contacts 35a and 35b, while relay 36 is provided with normally open contacts 36a and 36b, the latter contact being shown within armature current control circuit 29. Relay 36 actually performs a larger role in controlling the sequence of operation of the drive and control circuit than in its starting function as will become apparent hereinafter.

Armature current control circuit 29 comprises silicon controlled rectifiers 37 and 38 connected to armature 26 through series resistors 40 and 41, respectively, and a third silicon controlled rectifier 42 connected directly between battery 10 and armature 26. A relay 43 having normally open contacts 43a and 43b, the latter being shown in field current control circuit 30, is connected to be energized through contact 36b of relay 36. Another relay 45 having normally open contacts 45a and 45b and normally closed contacts 45c and 45d is connected to be actuated when the voltage across armature 26 and series field 28 reaches a predetermined value. Contacts 45b and 45d are in field current control circuit 30 while contact 45c is in enabling and starting circuit 31. A conventional semiconductor diode 47 is connected in inverse parallel with controlled rectifier 42 for a purpose to be described hereinafter.

The shunt field current control circuit 30 comprises parallel transistors 49 and 50 connected to shunt field winding 27 through emitter resistors 51 and 52 respectively. The bases of the two transistors are connected in parallel and are controlled by a circuit comprising tungsten filament bulb 54, resistor 55, contact 43b of relay 43 and variable resistor 57. Variable resistor 57 is preferably a stack of carbon wafers or carbon pile, the resistance of which is decreased by increasing pressure forcing the carbon wafers together. Variable resistor 57 is preferably controlled by accelerator pedal 18, as indicated by the dashed line between them, to vary the voltage level at the bases of transistors 49 and 50 and, therefore, the amount of current supplied to field winding 27. A diode 58 is connected across field winding 27 to prevent high inverse voltage due to rapid decrease in field current by providing a field current discharge path.

A normally closed contact 45d of relay 45 is connected across transistors 49 and 50 to connect battery 10 directly to shunt field winding 27 during starting of motor 11 as will be explained more fully hereinafter. Also connected across transistors 49 and 50 is a tungsten bulb 59 which, because its resistance varies directly with the voltage, tends to maintain a minimum supply of current of field winding 27. The path for current through shunt field winding 27 is completed through contact 36a or contact 45b as will be explained below.

Operation of an electrically powered automobile containing the drive and control system according to this invention is initiated by closing the enabling switch 32 and momentarily depressing starting switch 33 to energize relay 35 which locks in through normally open contact 35a. Depressing accelerator pedal 18 decreases the resistance of resistor 57 allowing relay 36 to be actuated through contacts 35b. Relay 36 locks in through contacts 36a and normally closed contacts 45c of relay 45.

Upon actuation of relay 36 contacts 36b allows a positive signal to appear at the gate of controlled rectifier 37 which thereupon conducts current through resistor 40 to armature 26 of motor 11. Closing of contact 36b likewise causes actuation of relay 43 and the closing of contacts 43a which in turn triggers controlled rectifier 38 into conduction to also supply current to armature 26 through resistor 41. Relay 43 is preferably of the time delay type so that gradual acceleration may occur in response to the current supplied through controlled rectifier 37 before controlled rectifier 38 is triggered into conduction by relay 43.

When the voltage across the armature and series field or motor 11 reaches a predetermined value, relay 45, which is a voltage controlled relay, is actuated causing the gate of controlled rectifier 42 to be triggered through contacts 45a so that controlled rectifier 42 conducts full current to armature 26, shutting off controlled rectifiers 37 and 38.

While motor 11 is accelerating, shunt field winding 27 is connected directly to battery 10 through normally closed contact 45d of relay 45.

Actuation of relay 45 opens contacts 45d to allow transistors 45 and 50 to control the current supplied to field winding 27, opens contacts 45c to interrupt that hold path for relay 36 and closes contacts 45b to provide another path to ground for current flowing in field winding 27 in addition to the path through contact 36a. Relay 36 now holds through contact 35b and resistor 57. Releasing accelerator pedal 18 will increase the resistance of resistor 57 and cause relay 36 to drop out. In such case, current through field winding 27 will still have a path to ground through contact 45b. The circumstances under which accelerator pedal 18 will normally be released will be explained below.

To summarize the theory of operation, since motor torque is directly proportional to the flux and to the armature current these are maximized at starting when high torque is desired. During higher speed driving the shunt field current is varied to vary the speed of the automobile since the motor r.p.m. varies inversely with the flux, which depends upon the field current.

Operation of the electrically powered automobile having a manual clutch and transmission is now virtually the same as operation of a conventional automobile. Depressing accelerator pedal 18 decreases the resistance of resistor 57 which lowers the voltage at the bases of transistors 49 and 50 thereby reducing the current supplied to field winding 27 which in turn causes motor 11 to accelerate. By manipulating accelerator pedal 18 and using the conventional clutch and transmission, operation of the vehicle proceeds in much the same manner as with a conventional automobile.

When accelerator pedal 18 is released, as for example, when braking or otherwise decelerating, relay 36 is deenergized which in turn deenergizes relay 43 and causes contact 43b to open. The resulting increase in the voltage level at the base of transistors 49 and 50 causes a large increase in the current supplied to shunt field winding 27 which in turn causes motor 11 to regenerate and supply current to charge battery 10 through diode 47. As the automobile is being braked to a stop, regenerative current flow through diode 47 to charge battery 10 continues until the armature voltage of motor 11 is no longer sufficient to cause such current flow. Thereupon relay 45 opens and the sequence of operation will begin anew when accelerator pedal 18 is again depressed.

If, on the other hand, the automobile is accelerated by depressing accelerator pedal 18 before relay 45 is allowed to release, relay 36 will be actuated which will in turn actuate rely 43. During the slow operating time of relay 43 controlled rectifier 37, having been triggered through contact 36b, conducts current to armature 26. When relay 43 is fully actuated, contacts 43b will close reducing the current supplied to field winding 27 and triggering controlled rectifier 42 again into conduction so that normal operation resumes.

During normal operation minimum current to shunt field winding 27 and therefore maximum speed and acceleration is determined by tungsten filament bulbs 54 and 59.

The customary automobile accessory battery 61 is connected in series with the field winding 27 to be charged by the current flowing through field winding 27. The automobile lights 62 and horn 63 are connected across the accessory battery 61 so that they may be supplied from the accessory battery 61 or by current flowing through field winding 27.

Smoothness of operation is greatly enhanced by carbon pile resistor 57 which allows the field current to be continuously rather than incrementally varied, and by emitter resistors 51 and 52, the emitter resistors providing a measure of negative feedback which provides smoother current flow in transistors 49 and 50 and smoother acceleration. Power consumption in the control circuit is minimized since only a small current in carbon pile resistor 57 is needed to control the much larger current in field winding 27, and the relays consume little power. The control system of this invention thus controls the speed and acceleration of an electrically powered automobile effectively and efficiently without the excessive power consumption and jerky operation characteristic of some prior systems.

FIG. 4 shows a charging circuit by which battery 10 can be charged from a normal 120-volt line at every opportunity. The circuit is equipped with a power cord terminating in a conventional male plug 65 one pin of which may be grounded. When plug 65 is connected to a suitable source of AC power a conventional AC relay 66 is actuated closing contacts 66a and 66b and openings contact 66c. The contacts of relay 66 operate to disconnect battery 10 from the normal automobile ground through contact 66c and connect it to the negative output terminal of rectifier 68 through contact 66b. Alternating current is rectified by bridge circuit 68 and the rectified current charges battery 10, the rate of charge being indicated by ammeter 69, which includes shunt 70.

An ampere-hour meter 71 serves as a "fuel gauge" monitoring the state of charge of battery 10. Ampere-hour meter 71 integrates current and time so that current flowing out of battery 10 for a particular amount of time causes the indicator of meter 71 to move a certain amount in one direction while the same amount of current flowing into battery 10 for the same time will cause the indicator to return nearly to its original position. Meter 71 is preferably calibrated in terms of the ampere hour capacity of battery 10.

Referring now to FIG. 5 there is illustrated schematically a circuit by which motor 11 may be employed as a generator to charge battery 10 when the automobile is being pushed or towed. The major portion of FIG. 5 is identical to FIG. 3. The only change is the addition of run-tow switch 73 which disconnects shunt field winding 27 from emitter resistors 51 and 52 of transistors 49 and 50 and connects the winding directly across armature 26 and series field 28 of motor 11. This connection allows motor 11 to be operated as a differential compound generator, charging battery 10 through diode 47 when the automobile is pushed or towed.

As noted above, it is intended that the drive and control system of FIGS. 1 to 5 may be employed in automobiles having an automatic hydraulic clutch as shown in FIG. 2. In FIG. 6, electrical means for controlling and operating the automatic clutch in conjunction with the drive and control system of this invention are shown schematically.

Referring to FIGS. 2 and 6 relay 35' corresponds to relay 35 in FIG. 3, but is a lower voltage relay actuated from the normal accessory battery 61. A motor driven vacuum pump 23 and a motor driven hydraulic pressure pump 24 (FIG. 2) are supplied to provide vacuum and hydraulic pressure to operate the clutch. Motors 75 and 76 drive vacuum pump 23 and pressure pump 24 respectively. A pressure switch 77 opens to deenergize vacuum pump motor 75 when vacuum is sufficient. A solenoid valve 78 initiates clutch release when energized. A relay 80 having normally open contacts 80a and 80b and normally closed contacts 80c and 80d is actuated through a switch 81 and its own contact 80c and holds through its own contact 80a and a normally closed switch 83. Switch 83 is actuated by accelerator pedal 18 as indicated by the dashed line therebetween. Switch 81 is actuated by brake pedal 19 as indicated by the dashed line. A normally open switch 84 which is actuated momentarily whenever manual gear shift 17 is manipulated also operates solenoid valve 78 to initiate release of the clutch.

Operation of the electrically powered automobile with an automatic clutch is essentially the same as with a manual clutch except for the obvious differences due to having the automatic clutch. Starting is initiated by closing enabling switch 32 and momentarily depressing starting switch 33 which actuates relay 35'. Relay 35' holds in through its normally open contact 35a' and allows actuation of relay 36 (FIG. 3) when accelerator pedal 18 is depressed. The sequence of operation then continues as explained above in connection with FIG. 3.

For hydraulic clutch operation clutch release solenoid valve 78 is actuated to release the clutch in either of two ways. Manipulation of manual gear shift 17 momentarily closes switch 84 and actuates solenoid valve 78, or actuation of relay 80 energizes solenoid valve 78 through contact 80b.

Relay 80 is actuated by depressing brake pedal 19 which closes switch 81 and energizes relay 80 through its own contact 80c. So long as relay 80 remains actuated, clutch release solenoid valve 78 remains actuated through contact 80b and power is removed from pressure pump motor 76 by contacts 80d. Relay 80 remains actuated through its own contact 80a and normally closed switch 83 actuated by accelerator pedal 18. When accelerator pedal 18 is depressed to accelerate the automobile, switch 83 opens and relay 80 releases causing the clutch to reengage.

In summary, the hydraulic clutch is released by manually shifting gears (switch 84) or by depressing the brake pedal 19 (switch 81). The clutch is reengaged in the former case by completing the act of shifting gears and in the latter case by depressing accelerator pedal 18.

While the clutch control circuit of FIGS. 2 and 6 is advantageously used in conjunction with the basic drive and control system of FIG. 3 it will be apparent to those skilled in the art that the clutch control circuit may be used in automobiles independently of the basic drive and control circuit.

In the description of the drive and control system for electrically powered automobiles encompassing FIGS. 1 and 6, circuit breakers, fuses and similar circuit devices not necessary for the description of operation have been omitted from the drawings and from the discussion. Such devices may, of course, be supplied by those skilled in the art.

While there has been shown and described one illustrative embodiment of this invention, it is to be understood that the concepts thereof could be employed in other embodiments without departing from the spirit and scope of the invention.

What is claimed is:

1. A drive and control system for an electrically powered automobile comprising, a motor having an armature and a shunt field, a battery for supplying power to said motor, electronic switching means between said battery and said armature for conducting varying amounts of current to said armature, first control means for initiating conduction by said switching means of a limited amount of current to said armature, second control means having a first state operative to connect said battery to said field and a second state determined by the armature voltage of said motor operative to initiate full conduction by said switching means, transistor means operative to control current to said shunt field during the second state of said second control means, and means for controlling the conduction of said transistor means.

2. The system of claim 1 further comprising a rectifier connected across said switching means to allow charging of said battery during regenerative operation of said motor.

3. The system of claim 2 further comprising a switch for connecting said shunt field directly across said armature, whereby said motor may operate as a generator to charge said battery through said rectifier when said automobile is towed.

4. The system of claim 1 further comprising means for charging said battery from an AC source external to said automobile, said means comprising conductor means for conducting current to said battery, a connector for connecting said conductor means to a source of AC power, a rectifier for rectifying the current flowing to said battery, and relay means operative upon connection of said connector to said AC source to connect said battery to the output of said rectifier.

5. The system of claim 1 further comprising switch means for controlling said first control means to thereby initiate operation of said drive and control system.

6. The system of claim 1 wherein said second control means has a normally closed condition bypassing said transistor means for connecting said battery to said shunt field and a normally open condition for supplying a signal to said switching means upon actuation of said second control means, said signal initiating full conduction of said switching means.

7. The system of claim 1 further comprising a tungsten filament bulb connected across said transistor means to conduct a minimum current to said shunt field, whereby the maximum speed of said automobile is determined.

8. The system of claim 1 wherein said means for controlling the conduction of said transistor means comprises a variable resistor coupled to the base of said transistor means and an accelerator pedal connected to said resistor for varying the resistance thereof, whereby pressure applied to said accelerator pedal varies the amount of conduction of said transistor means.

9. The system of claim 1 wherein said switching means comprises at least one controlled rectifier having a resistance in series therewith coupled to said armature, and another controlled rectifier coupled directly to said armature.

* * * * *